May 14, 1968     K. D. STEPHENS, JR     3,383,682

RADAR GLASSES FOR THE BLIND

Filed Oct. 24, 1966

INVENTOR.
KENNETH D. STEPHENS, JR.
BY
*Lynn T. Foster*
ATTORNEY

United States Patent Office 3,383,682
Patented May 14, 1968

3,383,682
RADAR GLASSES FOR THE BLIND
Kenneth Dean Stephens, Jr., Salt Lake City, Utah,
assignor to University of Utah
Filed Oct. 24, 1966, Ser. No. 589,110
7 Claims. (Cl. 343—7.7)

ABSTRACT OF THE DISCLOSURE

A navigational method and apparatus for blind persons incorporated in a pair of eye glasses, at least one temple portion of which comprises a directional antenna for both transmitting and receiving signals and a heel portion of which contains a single circuitry unit to generate signals at a predetermined frequency and receive and amplify echoed signals having frequencies different from the transmitted frequency. A detectable warning system connected into the receiving and amplifying circuitry unit communicates the amplified signal to the person using the apparatus.

---

This invention pertains to radar-navigational systems, and particularly navigational systems implementing the Doppler-shift phenomenon, which may be used to guide blind persons.

Navigational methods for blind persons have historically presented serious difficulty to those connected with the problem. The apparent solutions to this problem are either inadequate or so expensive as to prohibit a vast majority of the blind from using the proposed solution. Moreover, a blind person generally prefers not to draw attention to himself, and previous attempts at navigational systems for the blind have been cumbersome and difficult to use.

Radar and radar-like systems have now been developed to a relatively high degree of precision and have been firmly established as an excellent navigational tool. These systems, however, are bulky, cumbersome, and seldom portable enough to be carried and operated by a single person. Moreover, the financial expenditure necessary to purchase and maintain such a system is completely beyond the capabilities of most individuals.

It would, therefore, be a significant advantage if a radar system were developed which could be easily concealed on the person, provide a precise signal describing the position and/or velocity of an object, and be reasonably priced for the average person. The present invention provides these advantages.

It should be understood that although the present invention contemplates many functions, it is presently preferred that it be used for assisting in the navigation of blind persons and will be described in connection with this function.

The present invention in its presently preferred form comprises an electronic transmitter encased in at least one ear-piece of a pair of modified eyeglass frames or the like. A signal of predetermined frequency is generated within an oscillator and transmitted along the temple portion of the frame which functions as a directional antenna.

A person using the "radar glasses" may selectively transmit the signal in predetermined directions by positioning the transmitting antenna with a turn of his head. The transmitted signal that strikes a moving object is bounced away from the object with a new frequency differing from the original frequency by an amount proportional to the velocity of the moving object. Thus, signals of a different frequency may be bounced back toward the transmitter. The same directional antenna that is used for transmission may also be used to receive the rebounded signals. These rebounded signals are received and transferred to suitable circuitry, which detects and amplifies the difference between the transmitted and received signals. The difference frequency is converted into vibratory or audible signals easily detected by the person wearing the glasses, whereby the wearer may distinguish the relative velocity of an object moving toward him or away from him.

Likewise, a movement of the person toward a stationary object may be detected by the same mechanism, thereby providing the person with a relatively accurate determination of the proximity of the object.

Therefore, it is a primary object of the present invention to provide a practical navigational system for the blind.

It is another object to provide a navigational system that is small enough to be conveniently concealed in the frame of a pair of eyeglasses.

It is a further object to provide a system of navigation wherein the transmitted signal may be directed by unobtrusively positioning the face as if to look around.

It is a still further object of the present invention to provide a means of navigation that will not completely occupy the use of a limb or one of the senses.

These and other objects and advantages will become more fully apparent from the following description and appended claims wherein:

Figure 1:
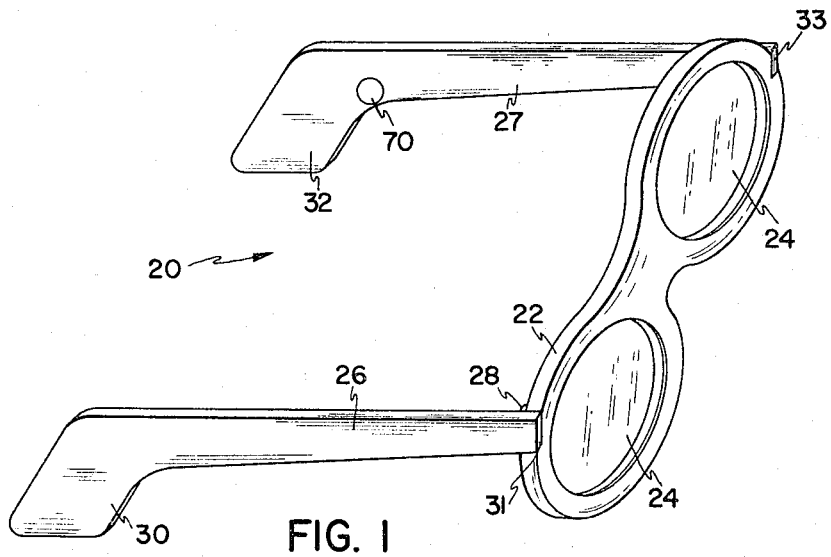
FIGURE 1 is a schematic perspective of a pair of eyeglasses and frame suitable for use with the present invention.

Reference is now made to FIGURE 1 wherein a modified pair of eyeglasses, generally designated 20, is depicted. The frontal framework 22 containing the lenses 24 may be constructed of any suitable material, and is presently preferred to be a somewhat rigid plastic. The lenses 24 may be formed of any suitable material and may be opaque or transparent, colored or clear, as desired. The temple portions 26, 27 are preferably constructed of a fiber rod material, or any material that is suitable for transmitting electronic signals such as microwaves, radio waves, or the like. The temple portions 26, 27 are preferably movably joined to the frontal portion 22 by hinges 28, of familiar and well-known construction. Moreover, the front edges 31, 33 of the temples 26, 27 are exposed such that signals directed therefrom are not normally obstructed or otherwise interfered with by the frontal portion 22.

Figure 2:
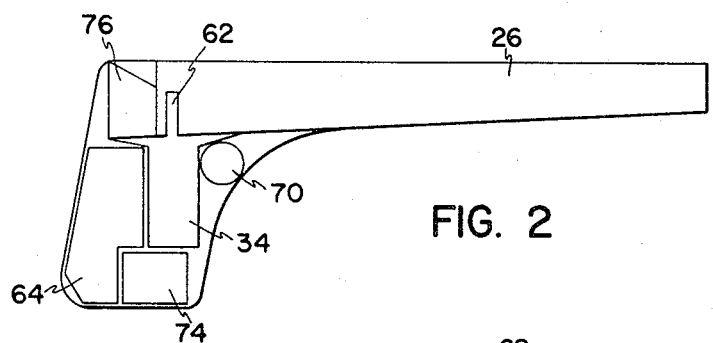
FIGURE 2 is a block diagram illustrating one possible arrangement of the major components of the invention in the glasses frame of FIGURE 1.

Heel portions 30, 32, best shown in FIGURE 2, are continuous with the temple portions 26, 27 respectively, and are designed to fit comfortably behind the ears of the wearer. Significantly, the heel portions 30, 32 further serve to compactly contain a radar head 34, antenna stub 62, and associated corner reflector 76; amplifier 64; power unit 74 and vibrator 70. Each of these components will hereafter be described.

Figure 3:
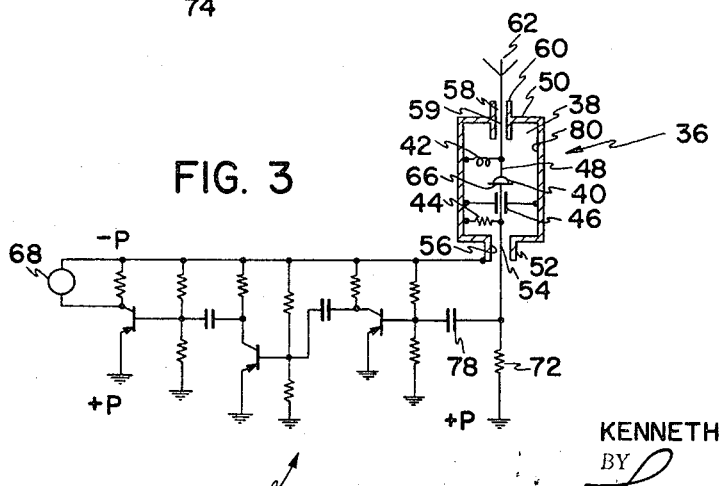
FIGURE 3 is a schematic, circuit diagram representing one presently preferred way of generating and receiving a signal.

The radar head 34 functions as an oscillator 36 (FIGURE 3) to produce high-frequency oscillations. Although any suitable high-frequency oscillator may be used, it is presently preferred that the oscillator 36 contain a microwave tunnel diode 40 that operates in a range of about six gHz. (giga-cycles per second). The tunnel diode 40 is enclosed in a sheath 50 which forms a resonant cavity 38 essentially symmetrically around the diode 40. The sheath 50 is preferably of metallic construction and silver coated on the inside portion 80 to enhance its reflective properties and thereby increase the efficiency of the oscillator 36. The size of the sheath 50 should be selected to constructively reflect radio frequency (RF) energy to support oscillation at a preedtermined desirable frequency. The sheath 50 is connected into a RF ground through the power supply (—P line).

The resonant cavity 38 further contains a LRC component arrangement 48 which constructively aids feedback in the oscillator 36 to support oscillation within the cavity 38 at the predetermined frequency. The tunnel diode 40 is positioned between an inductor 42 and a resistor 44. The relative sizes of the resistor 44, the inductor 42, and the tunnel diode 40 depend upon the desired signal frequency. The capacitor 46, situated beneath the tunnel diode 40 does not inhibit a flow of direct current bias into the tunnel diode. The DC bias is determined by selection of the size of resistor 72. In one preferred embodiment of the invention, a resistor value of 820 ohms developed a DC bias to the diode 40 of approximately 130 to 140 millivolts. This DC bias generates the required transition state. The capacitor 46 also by-passes high-frequency RF energy to ground while simultaneously allowing low-frequency signals to be passed into an amplifier 64. Moreover, capacitor 78 isolates the Doppler-shifted low-freqnency signal from the DC bias being channeled to the tunnel diode 40 described above. Therefore, only low-frequency Doppler signals are allowed to pass into the amplifier 64.

The amplifier 64 is preferably comprised of solid state circuitry. The amplifier 64 is assembled such that low-frequency signals appearing at a capacitor 78 from beneath the capacitor 46 are amplified sufficiently to actuate a mechanical transducer 68. The transducer 68 converts electrical pulses into mechanical energy which may be in the form of vibrations, audible signals, or the like.

Thus, low-frequency Doppler signals may be amplified and transmitted to the mechanical transducer 68 and thereby actuate a vibrator 70, miniature speaker, or the like, which may be placed to effectively alert the person to his rate of convergence with, or divergence from, an object.

The resonant sheath 50 of the oscillator 36 has an opening 56 in the lower portion 52 thereof, through which an electrical wire 54 carrying the DC bias may pass to connect into the diode 40. An opening 58 in the upper portion 60 facilities connection of the oscillation circuitry 48 into the antenna stub 62. The opening 58 further admits the antenna wire 59 into the resonant cavity 38 to enable the wire 59 to transmit oscillations to the antenna stub 62.

High-frequency oscillations generated within the oscillator 36 are radiated in all directions by the antenna stub 62. The antenna stub 62 is preferably fabricated from a silver-coated metallic material for both transmission and reception of signals. The corner reflector 76 directs many of the oscillations along the fiber-rod antenna 26 in a manner well known in the art. Thus, high-frequency oscillations are emitted from the ends 31, 33 of the temple antennae 26, 27 as highly-directional signals. The reflector 76 further serves to reflect the signals returning along the fiber-rod antennae 26, 27 back to the antenna stub 62.

The power unit 74, presently preferred to be a single-cell DC generator such as a mercury battery, develops a potential across the amplifier circuit 64 between +P and —P. It is presently preferred that the battery 74 be long lasting and easily replaceable in the heel portions 30, 32 of the glasses 20.

In the operation of the present invention, the power unit 74 develops a potential across the amplifier circuit from +P to —P. This potential is also used to bias the tunnel diode 40, through resistor 72, into a transitional state which results in the generation of random energy termed "noise." The random noise is rich in high-frequency vibrations which are constructively generated into high-frequency oscillations in the cylindrically shaped cavity 38. The high-frequency oscillations appear along the length of the antenna stub 62 and are radiated thereby along the temple antenna 26. The corner reflector 76 aids in reflecting the signal directionally forward of the terminal portion 31 of the temple 26.

The radiated signals emanating from the glasses strike an object and bounce back toward the source with a signal frequency differing from the radiated signal frequency by an amount proportional to the relative rate of convergence or divergence of the signal source and the object. This new frequency consists of the Doppler-shifted radio frequency energy. The rebounded signal is picked up by the temple antennae 26, 27 and transmitted to the oscillator 36 through the radar stub 62. The Doppler-shifted RF signal is detected by the tunnel diode 40 and a new signal representing the difference between the radiated signal and the Doppler-shifted signal is developed under the tunnel diode. This low-frequency difference signal is relayed through capacitor 46 which by-passes the high-frequency RF energy to ground and permits the difference frequency to be passed into the amplifier circuit 64 through input capacitor 78. This difference frequency represents the magnitude of the Doppler shift and is directly proportional to the rate of convergence or divergence of the signal source and the object.

The amplifier 64 amplifies the difference frequency passed by the capacitor 46 and transmits the signal to a mechanical transducer 68 which converts the signal into a detactable warning. The warning signal may be made audible by miniature speakers associated with the transducer 68 and the tone of the sound may vary with the rate of convergence. It is also contemplated that a vibrating button 70 be used whereby the magnitude of vibration is proportional to the rate of convergence.

Thus, it is now possible for a blind person to ascertain the relative position of stationary objects during the natural course of walking. A blind person in the course of normal walking may, in effect, examine his intended path by sweeping the area with a turn of his head and thereby transmit and receive signals describing the relative position of objects therein. Moreover, a blind person, stationary or moving, may be warned of the approach of objects or persons toward him by a change in the tone of an audible signal or the magnitude of vibration in a vibratory signal.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

1. In an apparatus for protectively guiding a blind person with an electronic unit portably carried essentially entirely in a pair of eye glasses having a single circuitry unit for both transmitting a reference signal and detecting and amplifying Doppler-shifted echoed signals and a single antenna for transmitting and receiving signals in directions determined by the orientation of the temple portion of the glasses:

means for transmitting a predetermined signal frequency that originates in the circuitry unit, along the directional antenna and generally forward of the face of the person;

means for receiving return signals in the same directional antenna rebounded from objects in the general direction of the transmitted signal such that such rebounded signals are returned to the circuitry unit;

means for electronically contrasting the frequency of the return signals with the frequency of the transmitted signal to obtain a difference frequency;

means for transforming the difference frequency into a warning signal which can be sensed by the person, whereby the instantaneous magnitude of the warning signal is proportional to the change in frequency of the rebounded signals.

2. In an apparatus for navigation:
means for creating a signal having a single predetermined frequency;
a single antenna (a) determining the transmitting direction of the created signal and (b) simultaneously picking up echoed signals;
diode means for instantaneously and continuously mixing the created signal and the echoed signal after the echoed signal is picked up by the antenna to form a mixed signal;
means associated with the creating means for isolating the mixed signal from subsequent created signals;
means for converting the mixed signal into a detectable warning.

3. In a navigational apparatus for guiding a blind person carried substantially within a pair of glasses comprising a replaceable direct-current power source, a directional antenna which forms an integral part of the glasses; a single circuit comprising (a) a signal generator which generates signals having a predetermined frequency which are induced into and emitted by the antenna (b) a signal mixer which combines echoed signals returned through the antenna with generated signals to obtain a difference frequency and (c) means to isolate and thereafter amplify the difference frequency; and means to produce a warning which can be sensed by the blind person and which instantaneously corresponds in intensity to the instantaneous magnitude of the difference frequency.

4. In a navigational apparatus for guiding blind persons as defined in claim 3, wherein said directional antenna comprises at least part of the temple portion of the glasses and essentially simultaneously transmits reference signals and receives rebounded signals.

5. In a navigational apparatus for guiding blind persons as defined in claim 3 wherein said means to produce a warning signal is at least in part in contact with the skin of the person and develops a vibration at the skin.

6. In a navigational apparatus for guiding blind persons (carried substantially within a pair of glasses) as defined in claim 3 wherein said means to produce a warning signal comprises means which audibly communicate the warning signal to the blind person through a speaker located in the heel portion of the glasses thereby obviating the necessity of using a special earphone.

7. In a navigational apparatus a single electronic circuit comprising an oscillator comprising (a) a tunnel diode adapted to generate high frequency signals and mix said signals with echoed signals to produce a new signal, (b) a resonance chamber surrounding the tunnel diode and electrically connected thereto, at least one by-pass spaced from an electrical conductor joining the tunnel diode to the power supply, said by-pass being electrically connected to the resonance chamber to pass only the new signal independent of additional higher frequency signals to means which amplify the new signal.

References Cited

UNITED STATES PATENTS

| | | | |
|---|---|---|---|
| 2,467,670 | 4/1949 | Hershberger | 343—8 |
| 2,496,639 | 2/1950 | Richardt et al. | 340—3 |
| 2,500,638 | 3/1950 | Krauth | 340—16 |
| 2,506,946 | 5/1950 | Walker | 340—16 |
| 2,533,299 | 12/1950 | Walsh | 340—16 |
| 2,560,587 | 7/1951 | Miller | 343—11 X |
| 2,574,596 | 11/1951 | Slaymaker | 343—7 |
| 2,600,708 | 6/1952 | Ulrich | 340—16 X |
| 2,721,316 | 10/1955 | Shaw | 340—16 X |
| 3,172,075 | 3/1965 | Kay | 340—1 |
| 3,260,991 | 7/1966 | Laakmann | 340—1 X |

RODNEY D. BENNETT, *Primary Examiner.*

C. L. WHITMAN, *Assistant Examiner.*